United States Patent [19]

Rabay

[11] 4,430,559
[45] Feb. 7, 1984

[54] ELECTRIC GRILL

[76] Inventor: Michel N. R. Rabay, Avenida Cuauhtemoc No. 891-502, Colonia Narvaret, Mexico 12, D. F.

[21] Appl. No.: 497,668

[22] Filed: May 24, 1983

[51] Int. Cl.³ ............................................. H05B 3/68
[52] U.S. Cl. ................................. 219/460; 99/421 V; 126/25 R; 219/214; 219/261; 219/400; 219/386
[58] Field of Search ............... 219/214, 218, 260, 261, 219/365, 385, 400, 386, 430, 438, 439, 441, 447, 460–461, 521, 524, 525; 126/25, 215, 385, 422; 99/238.3, 421 V

[56] References Cited

U.S. PATENT DOCUMENTS

| | | | |
|---|---|---|---|
| 2,662,965 | 12/1953 | Becher | 219/386 X |
| 2,866,883 | 12/1958 | Borden | 219/261 X |
| 3,339,505 | 9/1967 | Bean | 219/261 X |
| 3,396,715 | 8/1968 | Allen | 126/25 |
| 3,529,557 | 9/1970 | Treanor | 219/260 X |
| 3,887,786 | 6/1975 | Witt et al. | 219/214 |
| 3,959,620 | 5/1976 | Stephen, Jr. | 219/386 |
| 4,198,561 | 4/1980 | Fujioka | 219/460 X |
| 4,216,370 | 8/1980 | Charvat | 219/460 |

*Primary Examiner*—Volodymyr Y. Mayewsky
*Attorney, Agent, or Firm*—Albert L. Jeffers

[57] ABSTRACT

A portable electric cooking grill having a base including side walls defining an open space interiorly thereof, a convoluted electric resistance element mounted in the lower portion of the base, and a crown-like tray having a central opening therein and supported on brackets connected to the side walls above the resistance element. A plurality of rows of ventilation openings are provided in the side wall of the upper portion of the base. A rotatable, perforated disc element is rotatably supported on a bridge element above the central opening of the tray. The disc element comprises a plurality of openings having cup-shaped deflectors integral with the disc and positioned above the openings and oriented angularly relative to the plane of rotation of the disc and in the same circular direction so that the rising, heated air will cause the disc to rotate. A steel grill element is supported on the crown-shaped tray above the rotating disc.

11 Claims, 8 Drawing Figures

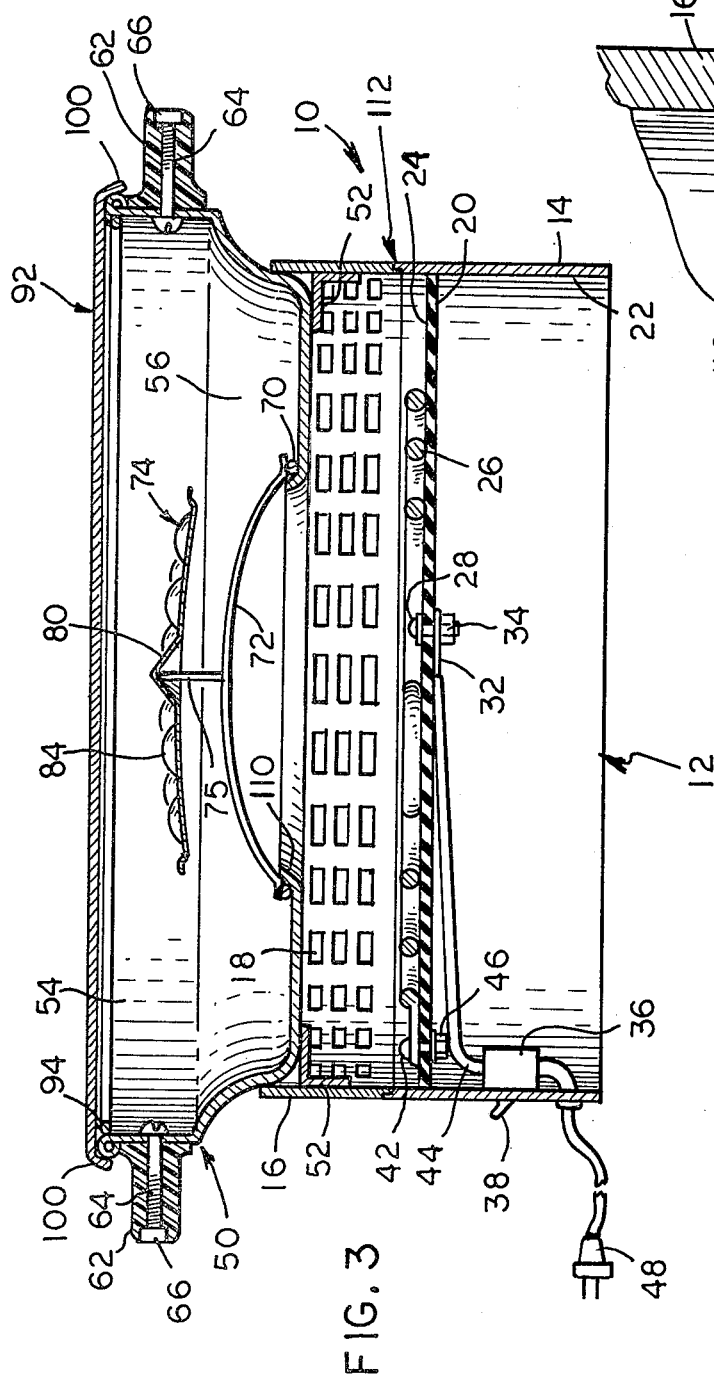
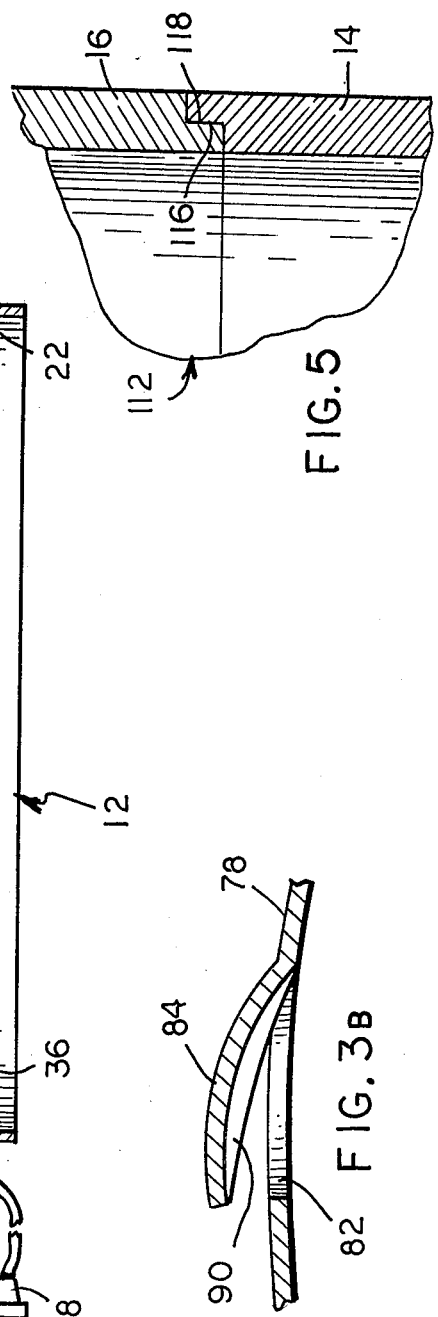

ELECTRIC GRILL

BACKGROUND OF THE INVENTION

The present invention relates to an electric grill, and in particular to such a grill which is portable in nature.

Prior art grills are known wherein the grill is adapted to be placed over the burner of a gas stove for the purpose of grilling meats, fish and the like. Such a device, however, is restricted to be used only with an existing stove. Although electric resistance grills are known, they often have the disadvantage of producing heat which is highly concentrated in the center of the cooking area with inadequate heating at the periphery thereof so that continual representing of the food is necessary to prevent uneven cooking.

SUMMARY OF THE INVENTION

The electric grill according to the present invention is self-contained in the sense that it includes an electric heating element which is connectible to a suitable source of electric current and controlled by means of a switch. Uneven cooking of foods is prevented by providing a crown-like tray having a central opening positioned above the heating element, and a rotating perforated disc positioned between the central opening of the tray and the central portion of the overlying grill. The disc comprises a plurality of openings having cup-shaped deflectors positioned above the openings and oriented such that hot air produced by the heating element will impinge on the deflectors and cause the disc to rotate in a horizontal plane. This provides an indirect path for the rising hot air between the heating element and the food which is being cooked, and produces a uniform distribution of the heat.

Specifically, the present invention contemplates an electric cooking grill comprising a base including side walls defining an open space interiorly thereof and including an upper portion and a lower portion, a convoluted electric resistance element mounted in the lower portion of the base, and a crown-like tray having a central opening therein and supported on brackets connected to the interior side walls of the base. A plurality of ventilation openings, which are preferably rectangular in shape, are provided in the side wall of the upper portion of the base. A bridge support is supported on the tray, and the rotatable, perforated disc element is rotatably supported on the bridge support for rotation in a generally horizontal plane. A grill, which is preferably circular in shape, is supported on the tray above the disc.

It is an object of the present invention to provide an improved, portable electric grill which is efficient in operation and produces a uniform flow of heat to the food being cooked.

A further object of the present invention is to provide a grill which can easily be disassembled for cleaning.

The above-mentioned features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 3 is a vertical sectional view of the grill according to the present invention;

FIG. 3B is a sectional view taken along line 3B-3B of FIG. 3A and viewed in the direction of the arrows;

FIG. 5 is an enlarged, fragmentary, sectional view of the base.

DESCRIPTION OF THE PREFERRED EMBODIMENT

Figure 1:
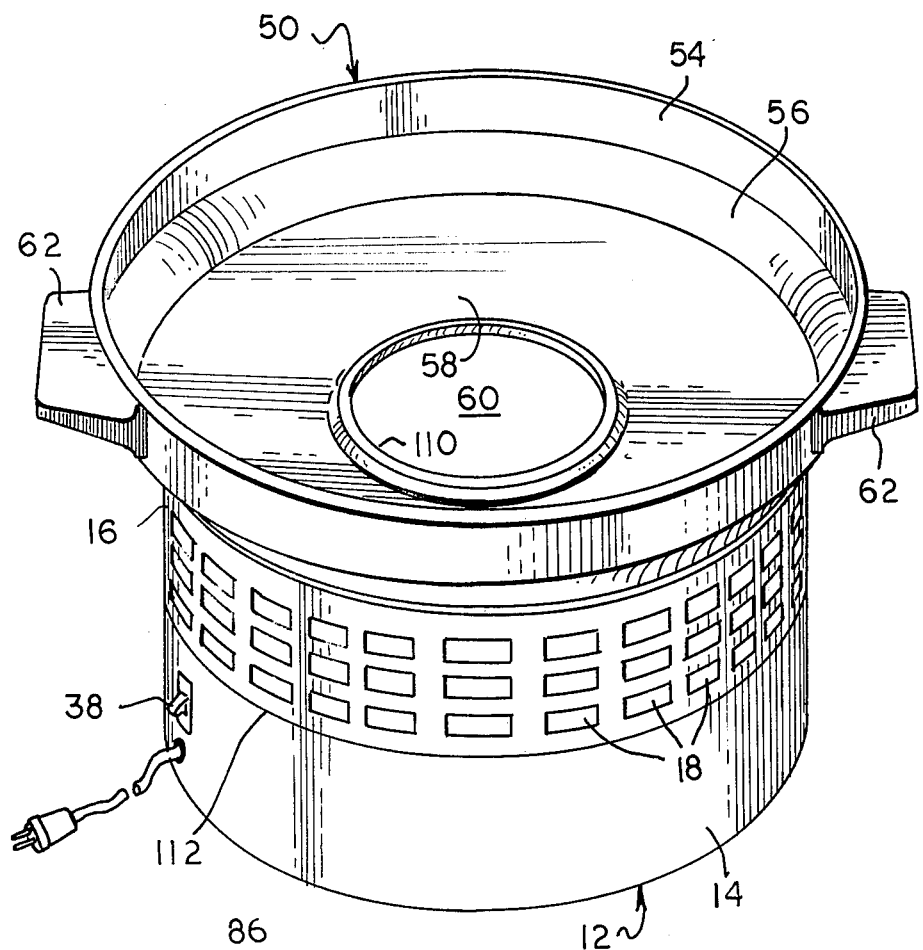
FIG. 1 is a perspective view of the assembled base and crown-like tray forming a portion of the present invention.

Referring now in detail to the drawings, the electric grill 10 of the present invention comprises a generally cylindrical metallic base 12 comprising a lower portion 14 and an upper portion 16, which are welded together, and form the side walls of the base. If desired, portions 14 and 16 could be integral. Upper portion 16 is provided with a plurality of rectangular openings 18 extending therethrough, wherein some of the openings 18 are larger than others. Rectangular openings 18 function to provide a sufficient flow of air into the interior of base 12 when the grill 10 is operated.

Figure 2A:
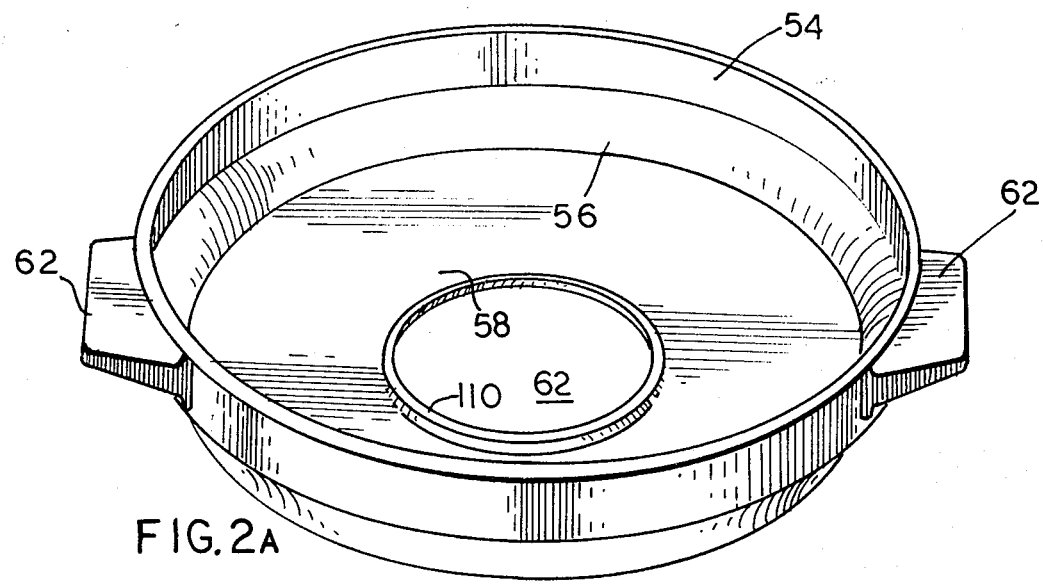
FIG. 2A is a perspective view of the tray.
Figure 2:
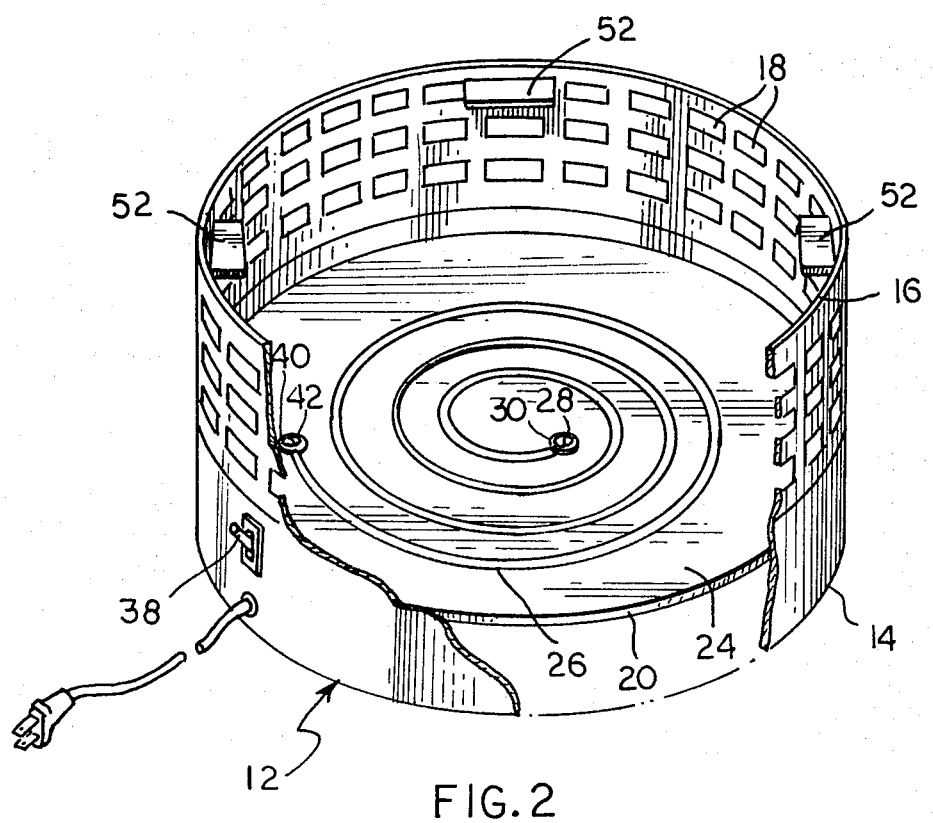
FIG. 2 is a perspective view, partially in section, of the base assembly.
Figure 4:
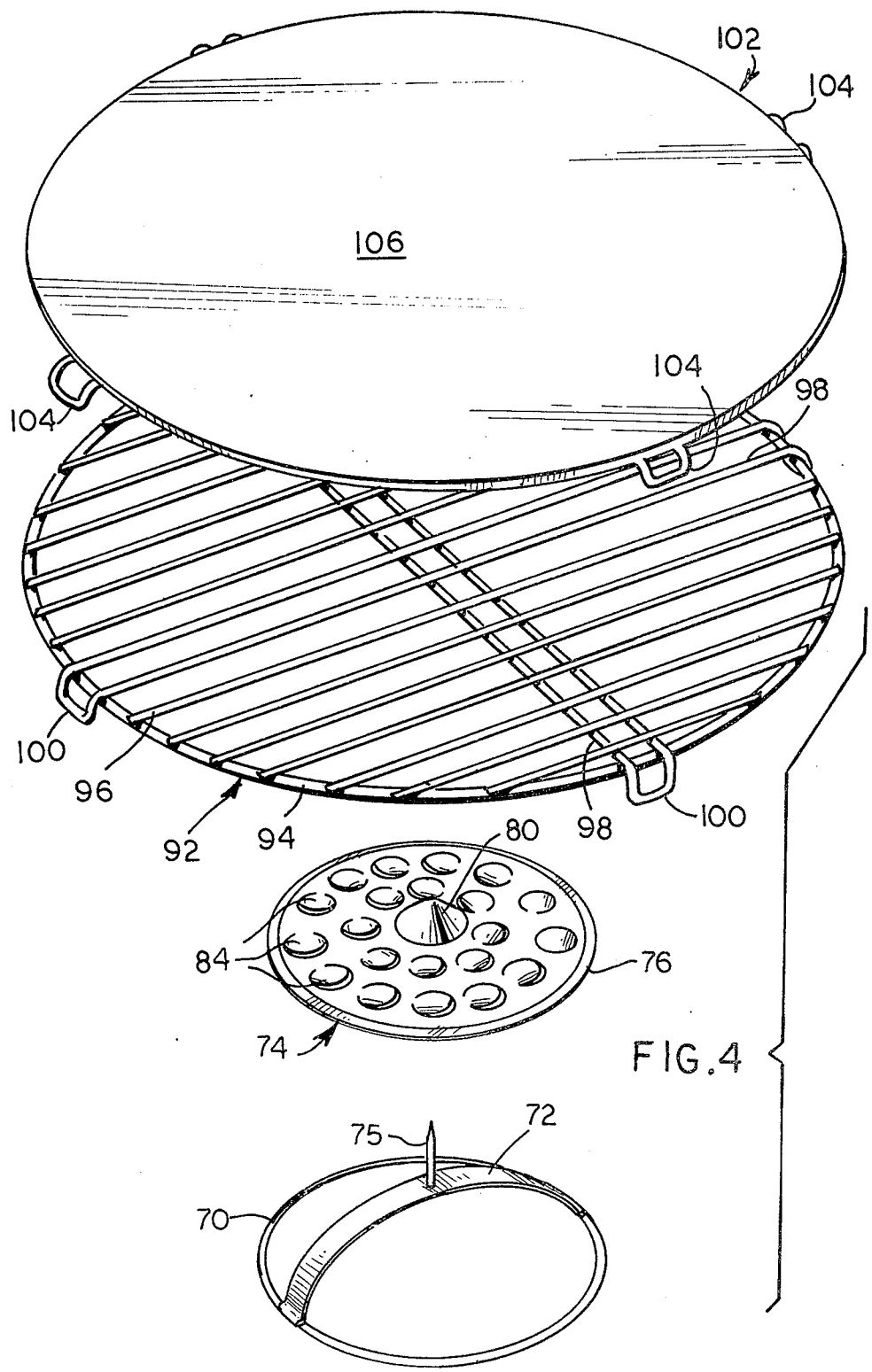
FIG. 4 is a perspective view of the cooking plate and a perspective, exploded view of the grill, disc and bridge element.

A circular plate made of an electrically insulating material, such as a suitable ceramic or asbestos material, is secured to the inner surface 22 of base lower portion 14. A conventional electric resistance heating element 26, which is formed into a spiral configuration as illustrated in FIG. 2, is supported on the upper surface 24 of plate 20. A bolt 28 extends through an eye connector 30 in electrical contact with resistance element 26 and through base 20 where it is secured to wire 32 by means of nut 34 as illustrated in FIG. 3. Wire 32 is connected to one side of electric switch 36 having an operating lever 38 extending through base 14 so that it can easily be operated by the person using the drill 10. Switch 36 is secured to base lower portion 14. The other end of electric resistance heating element 26 is in electrical contact with eye connector 40, which is secured to base 22 by means of bolt 42 extending through it and in electrical contact with wire 44. Wire 44 is secured to bolt 42 by nut 46, and is connected to switch 36. Switch 36, which is preferably a single pole single throw switch, is supplied with electric current over conventional power chord 48. When power chord 48 is connected to an electrical receptacle and switch 38 is closed, the electric current passing through resistance element 26 will cause element 26 to become hot.

A crown-like tray element 50 is supported on four equidistantly spaced brackets 52, which are welded or bolted to the upper portion 16 of base 12. Tray member 50 comprises a cylindrical upper portion 54, a tapering and somewhat arcuate lower portion 56, and a slightly dished bottom 58. A central opening 60, which is smaller in diameter than the outer diameter of heating coil 26, is provided within the bottom 58 of tray member 50. A pair of handles 62 (FIG. 3) are secured to the upper portion 54 of tray member 50 by bolts 64 and nuts 66.

A bridge element 68, which is shown in FIGS. 3 and 5, comprises an annular base portion 70 formed of rod material, and a flat ball portion 72 welded to base portion 70 and extending in an arcuate fashion diametrically from one side of base portion 70 to the other. A pointed bearing pin 74 is welded or otherwise secured to ball member 72 and extends upwardly in a generally vertical direction.

Figure 3A:
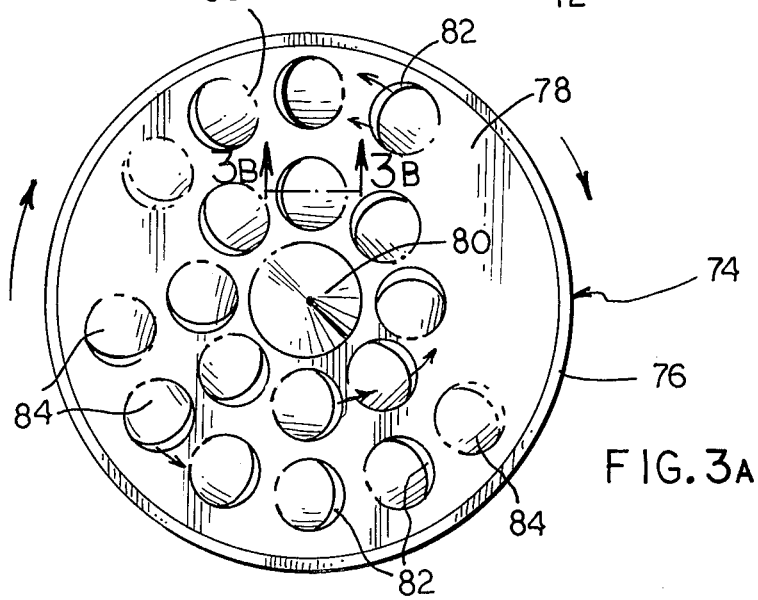
FIG. 3A is a plan view of the rotatable disc element.

A perforated disc element 74, which is illustrated in detail in FIG. 3A, is formed by a stamping operation from a sheet of flat stock. Disc member 74 includes a rim 76 encircling the generally flat base portion 78, and a hallow, cone-shaped hub portion 80. A plurality of nearly circular openings 82 are formed in base portion 78, and are arranged in two concentric circles as illustrated in FIG. 3A. Openings 82 are imperfectly cut from base portion 78 so that deflector portions 84 remain attached to base 78 by a small bridge of material 86. Deflector portions 84 are formed into shallow cup shapes either before or during the punching operation which forms openings 82. The cross-sectional shape of one of deflectors 84 is illustrated in FIG. 3B.

Disc element 74 is balanced on bearing pin 75, the point of which engages the apex of cone-shaped hub portion 80. Since the area of contact between bearing pin 74 and hub portion 80 is minimal, disc member 74 is able to rotate freely. In order to impart rotational movement to disc member 74, deflectors 84 are bent upward slightly so that they are all oriented angularly to the horizontal plane of rotation of disc member 74 and in the same circumferential direction. When heating element 26 is energized, it heats the air above it, which in turn pulls fresh air in through ventilating openings 18. This heated air rises through the central opening 60 in tray 80, and then through openings 82 in disc member 74. The rising air impinges on the inclined lower surfaces 90 of deflectors 84 and imparts rotational movement to disc member 74 in a clockwise direction as viewed in FIG. 3A. Not only is there provided an indirect path for the hot air produced by heating element 26 as it flows upwardly, but the flow pattern is under constant rotation thereby producing a very uniform heating pattern. P Grill 10 is provided with alternative cooking surfaces, one of which is illustrated in FIG. 5 and is in the form of an open grate 92. Grate 92 is preferably made of steel or wrought iron, and comprises a circular outer ring 94, a plurality of crossbars 96, and two crossed support members 98. Support members 98 terminate in downwardly turned feet 100, which extend over the upper edge of tray member 50 as shown in FIG. 3.

Alternatively, a plate or griddle member 102 made of aluminum, steel or cast iron may be used. It is provided with two crossed support members 104 similar to members 100 in FIG. 5, which are welded to the lower surface thereof. Alternatively, four separate feet similar to the ends of support members 104 could be welded to plate 102. The food to be cooked is placed on the upper surface 106 of plate 102, which is heated by conduction as the hot air impinges on its lower surface.

The assembled grill unit 10 is quite stable even though its major parts are not bolted together. Tray member 50 is nested within base member 12, and griddle member 92 is firmly seated against tray member 50 by virtue of feet 100 extending over the upper edge of tray member 50, and outer ring 94 engaging the inner surface thereof. The base portion 70 of the bridge member engages the upturned circular inner edge 110 of the bottom 58 of tray member 50.

If additional compactness is desired for purposes of shipping or storing the unit, the upper and lower portions 16 and 14 of base member 12 could be nested together by means of the interlocking configuration 112 shown in FIGS. 3 and 6. In this case, an annular step 116 is formed in lower portion 14 and a mating annular step 118 is formed in upper portion 16.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An electric cooking grill comprising: a base including side walls defining an open space interiorly thereof and including an upper portion and a lower portion, a convoluted electric resistance element mounted in a lower portion of said base, a plurality of rows of ventilation openings in the side wall of the upper portion of said base, a plurality of interior support brackets on said side walls, a crown-like tray having a central opening therein and supported on said brackets above said resistance element, a bridge support supported on said tray, a rotatable, perforated disc element rotatably supported on said bridge support for rotation in a generally horizontal plane, and a circular grill element supported on said tray above said disc.

2. The grill of claim 1 wherein said base is cylindrical, there are three rows of said ventilation openings, and at least some of said openings are formed as rectangular slots.

3. The grill of claim 2 wherein said support brackets are substantially equidistantly spaced.

4. The grill of claim 3 wherein there are four of said support brackets, and said grill element is supported on at least four legs.

5. The grill of claim 4 wherein said resistance element is formed as a coil.

6. The grill of claim 1 including switch means for selectively energizing said resistance element.

7. The grill of claim 1 including a plate in the lower portion of said base on which said resistance element is supported.

8. The grill of claim 1 wherein said bridge support comprises an upstanding bearing pin which is received in an indentation formed in the lower surface of said disc, and said disc is balanced on said bearing pin.

9. The electric grill of claim 8 wherein said disc comprises a plurality of openings, cup-shaped deflectors integral with said disc and positioned above said openings and oriented angularly relative to the plane of rotation of said disc.

10. The electric grill of claim 1 wherein said disc comprises a plurality of openings, and cup-shaped deflectors integral with said disc and positioned above said openings and oriented angularly relative to the plane of rotation of said disc.

11. The grill of claim 1 wherein said base is cylindrical, said resistance element is formed in the shape of a coil, and said grill element is circular.

* * * * *